G. W. DOVER.
SEMISPHERICAL BALL BEARING STRUCTURE.
APPLICATION FILED NOV. 25, 1919.

1,346,400.

Patented July 13, 1920.

INVENTOR:
George William Dover
by Chas. H. Luther
ATTORNEY.

UNITED STATES PATENT OFFICE.

GEORGE WILLIAM DOVER, OF CRANSTON, RHODE ISLAND.

SEMISPHERICAL BALL-BEARING STRUCTURE.

1,346,400. Specification of Letters Patent. Patented July 13, 1920.

Application filed November 25, 1919. Serial No. 340,598.

*To all whom it may concern:*

Be it known that I, GEORGE WILLIAM DOVER, a citizen of the United States, residing at Cranston, in the county of Providence and State of Rhode Island, have invented a new and useful Improvement in Semispherical Ball-Bearing Structures, of which the following is a specification.

In machines requiring delicately adjusted bearings, ball-bearings of some form are generally used. For machines requiring extreme delicate adjusting in the bearings, it is necessary that the friction in the ball-bearings used in such machines be reduced to a minimum.

The object of my invention is to produce a ball-bearing structure for such machines, in which friction in the bearings is reduced to the lowest possible point.

Further objects of my invention are to simplify and reduce the cost of construction of such ball-bearings.

My invention consists in the peculiar and novel construction of a semi-spherical ball-bearing structure having details of construction, as will be more fully set forth hereinafter and claimed.

Figure 1:
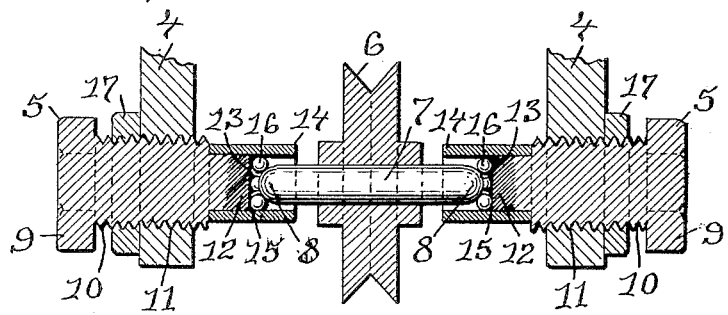
Figure 1 is a longitudinal sectional view through my improved semi-spherical ball-bearing structure.
Figure 2:
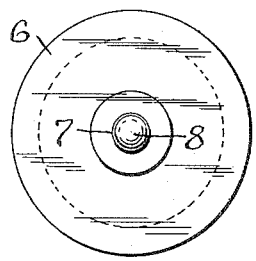
Fig. 2 is an end view of the semi-spherical end of the pulley shaft and pulley removed from the bearing.
Figure 3:
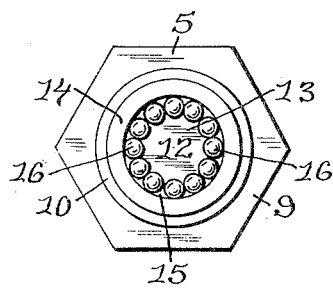
Fig. 3 is an enlarged end view of the ball-bearing screw removed from the bearing.

In the drawing 4. 4 indicates parts of a machine supporting ball-bearing screws 5. 5 which in turn rotatably support a grooved wheel 6 having a driven fit on a shaft 7 which has semi-spherical hardened ends 8. 8. Each of the ball-bearing screws 5. 5 has a head 9, an externally screw-threaded portion 10, which screws through a screw-threaded hole 11 in the part 4 of the machine, and a reduced and hardened end portion 12 terminating into a hardened flat end 13. A hardened collar 14 is forced over the end portion 12 and extends out beyond the end portion 12, as shown in Fig. 1, and with the flat hardened end 13 forms a raceway 15 for a row of hardened balls 16. 16, which engage with the semi-spherical hardened ends 8. 8 of the shaft 7. A lock-nut 17 is screwed on to the screw-threaded portion 10 of the screw and engaging with the part 4 of the machine, locks the screw in the adjusted position; the bearings being adjusted for tension or wear by turning the screw in the part 4 of the machine.

When in use, I find, that through the semi-spherical ends 8. 8 of the shaft 7 revolving on the rows of balls 16. 16, which in turn revolve in the raceways 15. 15 in the ends of the screws 5. 5, the friction in the bearings is reduced to a minimum, thereby reducing the power to turn the wheel 6 in the same ratio, said wheel being adapted to run on a track, not shown, and to support a movable part of the machine, the parts 4. 4 only of which are shown.

Having thus described my invention I claim as new:—

1. A semi-spherical ball-bearing structure comprising a screw having a reduced and hardened end portion terminating into a flat hardened end, a hardened collar over the reduced end of the screw and extending beyond the end of the screw, said screw end and collar forming a raceway, a row of balls in the raceway, a shaft having a semi-spherical end engaging with the row of balls, means for supporting the screw, means for adjusting the screw and means for locking the screw in the adjusted position.

2. In a semi-spherical ball-bearing structure, a ball-bearing screw 5 having a head 9, an externally screw-threaded portion 10, a reduced and hardened end portion 12 terminating into a flat hardened end 13, a hardened collar 14 forced over the end portion 12 and extending out beyond the end portion 12, and with the end 13 forming a raceway 15, a row of hardened balls 16. 16 in the raceway 15, and a shaft 7 having semi-spherical hardened ends 8. 8 engaging with the row of balls 16. 16 as described.

In testimony whereof I have signed my name to this specification.

GEORGE WILLIAM DOVER.